United States Patent [19]

Pearl, II et al.

[11] Patent Number: 5,333,467
[45] Date of Patent: Aug. 2, 1994

[54] APPARATUS AND METHOD OF PREVENTING FLUID ESCAPE FROM A CONDUIT

[75] Inventors: David S. Pearl, II, Fort Lauderdale; Louis H. Webb, III, Dania; Shaheed Mohammed, Davie; Dragan Bukur, Ft. Lauderdale, all of Fla.

[73] Assignee: Uniweld Products, Inc., Fort Lauderdale, Fla.

[21] Appl. No.: 140,981

[22] Filed: Oct. 25, 1993
(Under 37 CFR 1.47)

Related U.S. Application Data

[60] Division of Ser. No. 881,191, May 11, 1992, abandoned, which is a continuation-in-part of Ser. No. 795,995, Nov. 22, 1991, abandoned.

[51] Int. Cl.$^5$ .............................................. F25B 45/00
[52] U.S. Cl. .......................................... 62/77; 62/292; 251/148
[58] Field of Search ...................... 62/77, 292; 251/148

[56] References Cited

U.S. PATENT DOCUMENTS

| | | |
|---|---|---|
| 2,760,754 | 8/1956 | Gladstone . |
| 3,404,705 | 10/1968 | Zopf et al. . |
| 3,424,181 | 1/1969 | Morse ................. 62/292 X |
| 3,935,713 | 2/1976 | Olson . |
| 4,182,370 | 1/1980 | Karcher . |
| 4,396,154 | 8/1983 | Iovino et al. . |
| 4,476,892 | 10/1984 | Boyce . |
| 4,805,417 | 2/1989 | Weaver et al. .......... 62/292 |
| 5,010,743 | 4/1991 | Hale . |
| 5,080,132 | 1/1992 | Manz et al. ........... 62/292 X |

FOREIGN PATENT DOCUMENTS

1096337 12/1967 United Kingdom .

*Primary Examiner*—John C. Fox
*Attorney, Agent, or Firm*—Sandler Greenblum & Bernstein

[57] ABSTRACT

An apparatus and method for preventing an undesirable release of fluid from a conduit upon disconnection of the conduit. In a specific form of the invention, the apparatus includes a hose having a slide valve located therein adjacent an end of the hose for preventing the escape of liquids or gases, especially refrigerants, to the environment. The slide valve includes a substantially cylindrically shaped nipple having first and second bores extending axially therethrough, the first and second bores being divided and bounded by an integral wall of the nipple. The nipple includes a plurality of ports adjacent the integral wall which provide passages through the nipple to provide fluid communication between the first and second bores. A sleeve member is slidable disposed around the nipple and contains seals for providing a gas-tight and/or liquid-tight interface between the sleeve and the nipple. The sleeve member also includes an annular chamber for selectively providing the aforementioned fluid communication between the bores. A preferred embodiment of the invention includes a conduit having a threaded screw type valve which includes a substantially cylindrically shaped rear nipple emanating from its first end, having a central bore extending therethrough. The rear nipple is exteriorly threaded to a threaded valve body which, when rotated is capable of sealing and unsealing a valve set with a valve fitting for selectively opening and closing a passageway for the flow of liquid an/or gas from the rear nipple to a front nipple. The front nipple is capable of rotating with respect to the rest of the device without breaking its seal and can be removed and interchanged without a substantial loss of fluid.

7 Claims, 9 Drawing Sheets

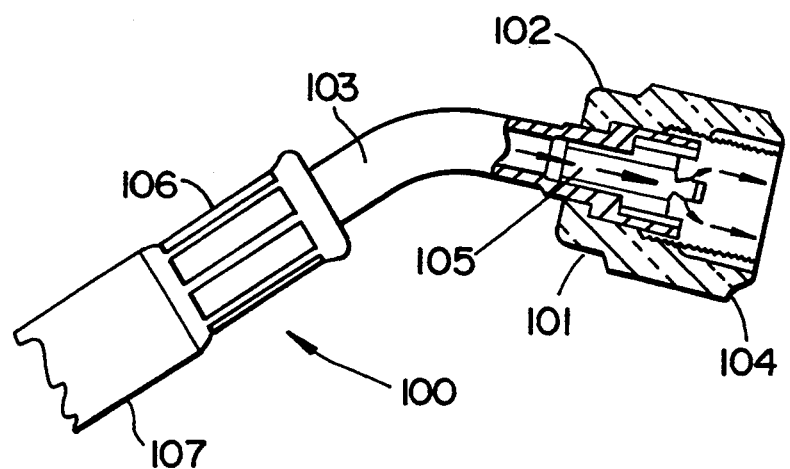
Fig_ 1
PRIOR ART
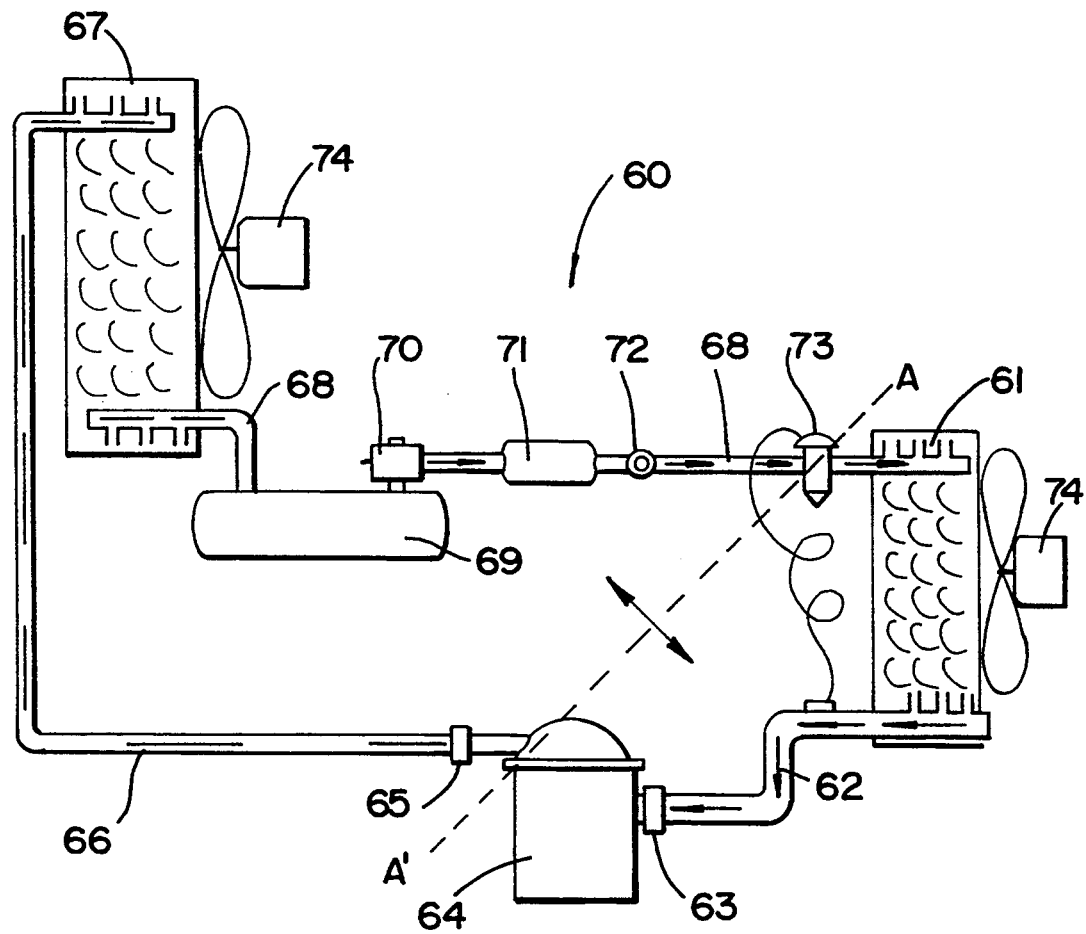
Fig_ 2

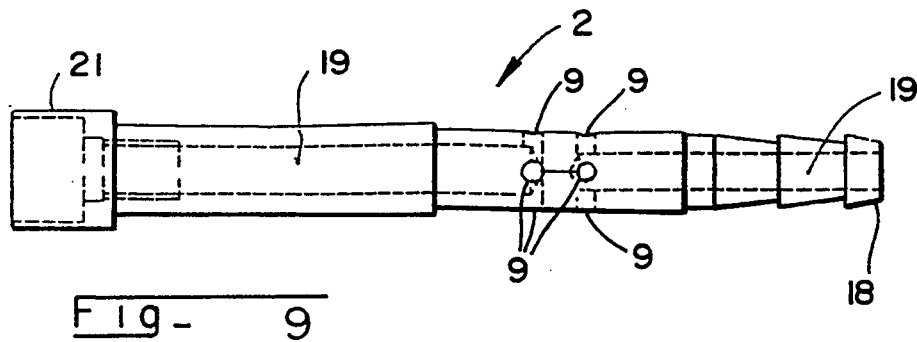
Fig- 9
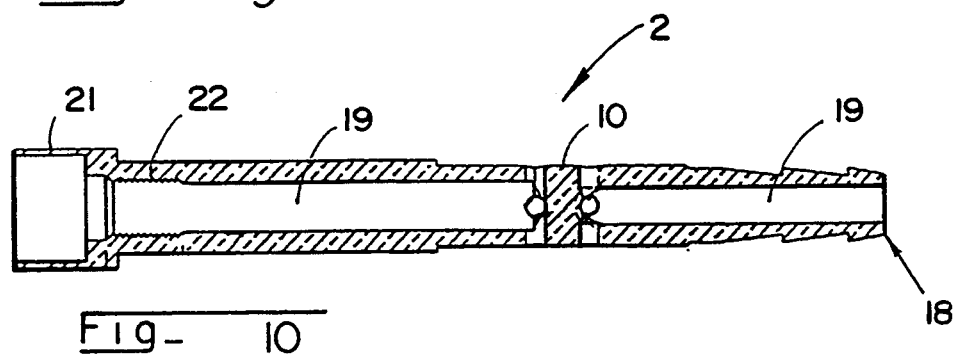
Fig- 10
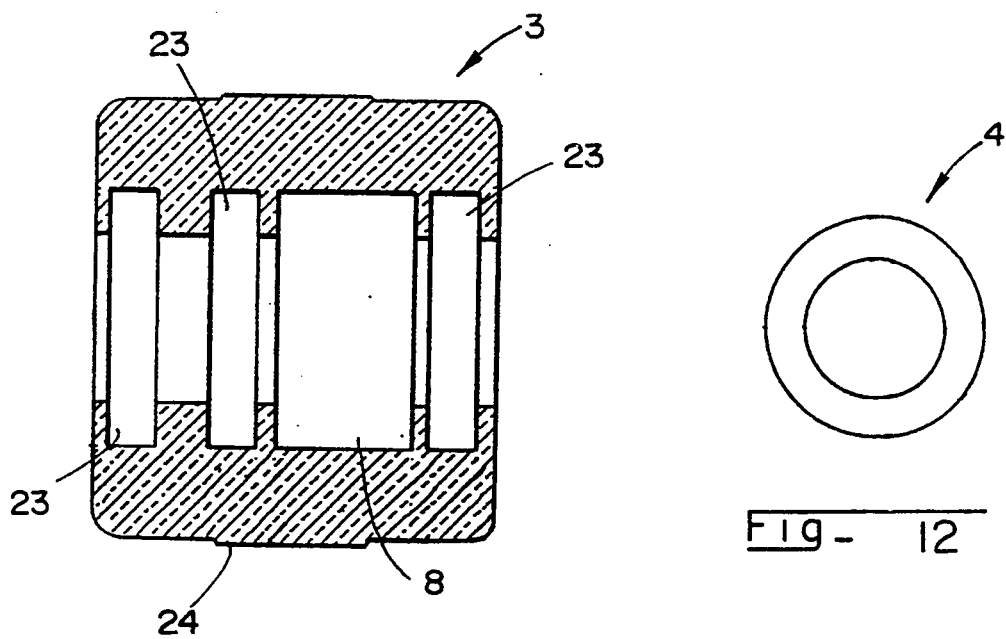
Fig- 11
Fig- 12

APPARATUS AND METHOD OF PREVENTING FLUID ESCAPE FROM A CONDUIT

This application is a division, of U.S. application Ser. No. 07/881,191, filed May 11, 1992, now abandoned, which is a continuation in part of U.S. application Ser. No. 07/795,995 filed Nov. 22, 1991, now abandoned.

BACKGROUND OF THE INVENTION

1. Field of the Invention

The invention concerns a device which is manually operable to shut off the flow of a fluid through a conduit and is especially useful for minimizing the amount of chloroflorocarbon refrigerants that escape to the atmosphere each time a refrigeration or air conditioning system is serviced. The invention is also directed to apparatus and method which employ one or more of the shut-off devices.

2. Description of Background Information

Current refrigeration and air conditioning service techniques include the use of a manifold which commonly has three refrigeration lines or hoses connected thereto. One line is connected through the manifold to a low pressure gauge and is used in servicing the low pressure side of a refrigeration/air conditioning system. A second line is connected through the manifold to a high pressure gauge and is used in servicing the high pressure side of a refrigeration/air conditioning system. A third line is connected to a port which commonly connects the ports in the manifold leading to the high and low pressure lines. The third line is used for connection to refrigerant or some other pressurized source, or a vacuum source.

Alternatively, a simpler device is commonly used for charging air conditioning/refrigeration systems which includes only one refrigeration line with a fitting for connection to a pressurized refrigerant source. This device may or may not include a pressure gauge.

In either case, the ends of the lines which are not connected to the manifold or fitting, i.e., the ends which are distal to the apparatus, do not currently include flow control mechanisms. Flow control is performed by means of high pressure and low pressure valves at the manifold. Consequently, whenever any of the aforementioned three lines are connected to a refrigeration or air conditioning system, the lines must be bled to purge the air from the lines so as to avoid contamination of the refrigeration system with air. This necessitates the release of a small amount of refrigerant to the environment each time a line is bled. Even more significant, when the lines are removed from the system after servicing, the entire volume of refrigerant contained within the lines escapes to the atmosphere, since there are currently no shut-off mechanisms at the distal ends of the refrigeration lines.

Chlorofluorocarbons, such as Freon, are the most common refrigerants in use today. Further, it has been hypothesized and it is becoming increasingly more evident that chlorofluorocarbons are a major cause of the degradation of the ozone layer of the atmosphere. Consequently, since the ozone layer's integrity is vital for the protection of the surface of the earth from damaging amounts of solar radiation, the necessity for reducing the amount of release of chlorofluorocarbons to the atmosphere is becoming more and more critical. Further, unnecessary wasting of chlorofluorocarbons can be expensive. The cost of R-12, for example, has recently doubled and will likely continue to increase as the use of chlorofluorocarbons tends to be phased out.

As other resources become increasingly scarce, and thus more valuable, the avoidance of unnecessary escape or spillage of other gases or liquids is also desirable. For example, water hoses or any hose in which a length thereof is disconnected from a particular apparatus is susceptible to an unnecessary release of water or other fluid therefrom upon such disconnection. Such unnecessary release can result merely in an unnecessary waste of the fluid or the inconvenience of a spillage thereof, for example, or, in the case of caustic fluids, for example, an additional hazard relating to such release.

SUMMARY OF THE INVENTION

Accordingly, it is an object of the present invention to provide a means for preserving a liquid, gas or vacuum within a hose, line or pipe after the hose, line or pipe has been disconnected from a fitting. The invention is especially directed toward preserving refrigerants, such as R-12, R-22, R-500, R-502,123 and 134A, within refrigeration service hoses after the refrigeration hoses have been disconnected from a refrigeration or air conditioning system at the completion of servicing.

To this end, the invention comprises a valve which gives a positive on/off control of the flow of a gas or liquid, whether or not under pressure, or a vacuum.

It is another object of the present invention to provide means for preventing the loss of refrigerants at the time of connection of the service hoses to the refrigeration/air conditioning system. This object is to be accomplished by eliminating the need to bleed or purge the hoses prior to servicing.

It is a further object of the present invention to provide means which may be used for preventing the loss of other valuable or hazardous liquids or gases to the environment, by providing a shut off mechanism at the distal end of a hose, pipe or line which is used to convey the gas or liquid from a source to a service point at the distal end of the hose, pipe or line.

It is a further object of the invention to provide apparatuses which are particularly useful in servicing refrigeration and air conditioning systems and are capable of preventing the loss of most of the volume of refrigerants which are located in the service hoses of the apparatus upon disconnection of the hoses from the refrigeration-/air conditioning system.

The Environmental Shutoff Valve of the present invention eliminates the venting of expensive refrigerants by containing it in the hose after each use. In a preferred embodiment of the invention, a simple rotation of the valve clockwise enables a full flow open/-charge, and a simple counterclockwise rotation enables close/capture. Further, in the preferred embodiment of the invention, interchangeable service connectors can be utilized that swivel 360 degrees to prevent the hose from twisting and kinking. The service connectors include an adjustable valve core depressor and can be made to be straight or with a 45 or 90 degree bend.

As other resources become increasingly scarce, and thus more valuable, the invention is foreseen as applying to other fields as well. Thus, it is a further object of the present invention to provide a hose, line or pipe having a flow controlling mechanism built integrally therein near the distal end of the hose, line or pipe for preventing the loss of the contents of the hose, line or pipe each time the hose, line or pipe is disconnected. For example, it is contemplated that a flow control device could be installed at the distal end of a garden hose to prevent the loss of a hose full of water. Similarly a flow control device could be installed in each radiator hose of a water-cooled automobile engine so as to preserve the radiator coolant whenever a hose is required to be disconnected for whatever reason. Many other applications exist, which are dictated by the need to preserve a liquid or gas due to ecological or economic reasons.

Other objects and advantages of the present invention and advantageous features thereof will become apparent as the description proceeds herein.

In summary, an apparatus according to the present invention comprises a conduit arrangement having an upstream end and a downstream end; means, affixed to the conduit arrangement at the downstream end, for connecting the conduit arrangement to a fluid-receiving device; and means, affixed to the conduit arrangement at a location upstream of and proximate to the means for connecting, for preventing fluid within the conduit arrangement to flow downstream at the aforementioned location.

The present invention contemplates a method of charging an air conditioning or refrigeration system, or for testing the same. Specifically, and in a general sense, a method of the invention comprises conducting a quantity of fluid to a fluid-receiving device and for preventing an undesirable escape of fluid into the environment, such method comprising the steps of connecting a first end of a conduit to the fluid-receiving device; connecting a second end of the conduit to a source of fluid; conducting a quantity of the fluid through the conduit to the fluid-receiving device; blocking flow of the fluid through the conduit in a direction from the first end toward the second end; and disconnecting the first end of the conduit from the fluid-receiving device.

Likewise, a method of the invention comprises testing a condition of a device containing an environmentally undesirable fluid and for preventing an undesirable escape of the undesirable fluid into the environment, such method comprising the steps of connecting a first end of a conduit to the device; connecting a second end of the conduit to a testing apparatus; maintaining the device and the testing apparatus in fluid communication; performing a testing procedure with the testing apparatus; blocking flow of the fluid through the conduit in a direction from the first end toward the second end; and disconnecting the first end of said conduit from the device.

More specifically, the invention specifically encompasses an environmentally sound apparatus including a hose having first and second ends with first and second means for connecting the hose for providing a gas-tight and/or liquid-tight connection between a liquid, gas or vacuum source and another device which requires servicing with a liquid gas or vacuum. The hose further includes means for preventing flow through the hose, such means being located adjacent one of the means for connecting and, preferably, the means for preventing flow comprises a valve, such as a slide valve. The slide valve is further defined by a substantially cylindrically shaped nipple having first and second bores extending axially therethrough, wherein the first and second bores are divided and bounded by means for blocking the bores, which is preferably an integral wall of the nipple.

The nipple includes a plurality of ports adjacent the means for blocking which provide passages through the nipple which circumvent the means for blocking. A sleeve member is slidably disposed around the nipple and contains means for receiving sealing members and means for connecting the ports to provide a fluid passage between the bores.

Sealing members are received within the recessed means for receiving of the sleeve member and provide a liquid-tight and/or gas-tight seal between the nipple and the sleeve member. At the same time, the sleeve member is axially slidable along the nipple to effectuate opening and closing of the fluid passage.

The environmentally sound hose is preferably a refrigeration hose, but may be another type of hose, line or pipe, e.g., a garden hose or a radiator hose for an automobile engine.

The environmentally sound hose preferably contains a valve which is integral with the hose. However, valves may also be provided for adapting existing hoses, lines, or pipes which are not equipped with such a valve mechanism but for which it would be either economically or environmentally advantageous to do so.

Also encompassed by the invention are devices for servicing refrigeration and air conditioning systems which include at least one means for variably controlling flow, at least one hose having first and second ends, wherein each hose is connected at the first end to the means for variably controlling flow, and the connection is gas-tight and/or fluid-tight. At least one means for selectively allowing and preventing flow through a hose, located adjacent the second end of a hose, are provided for selectively allowing and preventing flow through at least one hose. The means for selectively allowing and preventing flow through the hose is preferably at least one manually operable slide valve or a rotatable threaded screw type valve.

The slide valve includes a substantially cylindrically shaped nipple having first and second bores extending axially therethrough, with first and second bores being divided and bounded by means for blocking the bores. A plurality of ports adjacent the means for blocking, together with an annular recess in a sleeve member, provide passages through the nipple, which circumvent the blocking wall.

The sleeve member is slidably disposed around the nipple, and includes means for receiving sealing members and means for connecting the ports to provide a fluid passage between the bores. Sealing members are received in the means for receiving, and provide a liquid-tight and/or gas-tight seal between the nipple and the sleeve member. The sleeve member is axially slidable along the nipple to effectuate opening and closing of the fluid passage.

The screw type valve for controlling the flow of a gas or liquid under pressure, includes a first conduit having first and second ends; means for variably controlling flow at the first end of the first conduit; means for selectively allowing and preventing flow through the device having first and second ends and sealingly engaged with the second end of the first conduit at the first end of the means for selectively allowing and preventing flow through the device; a second conduit having first and second ends and emanating from the second end of the means for selectively allowing and preventing flow through the device; and means for connecting the second conduit to a second means for allowing and preventing flow. The means for connecting is mounted at the second end of the second conduit.

The means for selectively allowing and preventing flow through the device preferably includes a threaded screw type valve which is manually operable.

The threaded screw type valve is further disclosed to have a substantially cylindrically shaped rear nipple emanating from its first end, having a central bore extending therethrough, and an exterior surface, a portion of the exterior surface being threaded. A substantially cylindrically shaped front nipple emanates from the second end, having a central bore extending therethrough, for receiving a flow of gas or liquid from the central bore of the rear nipple. The rear nipple is threadably and sealingly engaged and the front nipple is sealingly engaged to the device. The valve further includes means for selectively blocking and unblocking flow between the first and second central bores.

The means for threadably and sealingly engaging the rear nipple and for sealingly engaging the front nipple is adapted to rotate to draw the means for selectively blocking and unblocking flow between the first and second central bores into sealing contact with the means for sealing when rotated in one direction, and when rotated in the other direction, draws the means for blocking and unblocking away from contact with the means for sealing. The threaded screw type valve according to the invention provides a high rate of flow between said central bores.

Preferably, the means for sealing includes a valve fitting, and the means for selectively blocking and unblocking flow between the first and second central bores includes a valve seat.

The means for threadably and sealingly engaging the rear nipple and for sealingly engaging the front nipple further includes first and second annular spaces on opposite sides with respect to the valve seat to permit a high flow rate of gas or liquid to pass from the first central bore to the second central bore or vice versa, when the means for selectively allowing and preventing flow through the device is selected to allow flow therethrough.

The threaded screw type valve further includes at least one seal between the rear nipple and the means for threadably and sealingly engaging the rear nipple and at least one seal between the front nipple and the means for sealingly engaging the front nipple. The front nipple is capable of rotating about its axis with respect to the means for sealingly engaging the front nipple and with respect to the rear nipple, without breaking its seal with the means for sealingly engaging the front nipple.

Means for retaining the front nipple in sealing contact with the means for sealingly engaging the front nipple, while allowing the front nipple to rotate abut its axis with respect to the means for sealingly engaging the front nipple preferably includes a threaded retaining nut, threading at an end of the means for sealingly engaging the front nipple which threadably engages with the threaded retaining nut, and a c-ring against which the threaded retaining nut and means for sealingly engaging the front nipple are torqued.

The means for selectively blocking and unblocking flow between the first and second central bores is preferably threadably engaged with the rear nipple by a threaded nut and screw.

The front nipple is adapted to be removed and replaced without loss of control of the flow of gas or liquid through the means for selectively allowing and preventing flow through the device, by removing the threaded retaining nut from the means for selectively allowing and preventing flow.

Also disclosed is a method of exchanging service connectors on a fluid servicing device while servicing by conducting a quantity of fluid to a fluid-receiving device, and for preventing an undesirable escape of fluid into the environment, which includes the step of connecting a first end of a first conduit to a source of fluid; blocking flow of the fluid through the conduit; disconnecting a service connector from the servicing device without substantial loss of fluid to the environment; and connecting another service connector to said servicing device. Thereafter, the newly connected service connector may be connected to a fluid-receiving device, after which the flow of fluid through the conduit is again enabled. Preferably the step of blocking flow is accomplished by closing a threaded screw type valve.

The disclosed devices may include a plurality of means for controlling flow, with the means for controlling flow being operatively connected within a manifold. A manifold may have two or more hoses connected thereto. Two hoses are disclosed as being connected through a manifold to means for variably controlling flow, and each hose may include means for selectively allowing and preventing flow located adjacent its distal or second end.

The manifold may further include a port which communicates with both means for variably controlling flow, and a third hose connected at its first end to the port by a connection which is gas-tight and fluid-tight. The third hose further includes means for selectively allowing and preventing flow through the third hose, which are located adjacent the second end of the third hose. Each means for selectively allowing and preventing flow is preferably a slide valve or a threaded screw type valve having characteristics as above-described. The preferred slide type valve is further described as having external means on the nipple for stopping the sleeve member at one of either the open or closed positions. Further, a ferrule is provided for attachment to a hose, line or pipe. The ferrule further includes external means for stopping the sleeve member at one of either the open or closed positions.

The threaded screw type valve is further described as having a retaining ring for preventing the threaded portion of the rear nipple from extending past the rear threaded portion of the threaded valve body.

In all embodiments of the invention, it is an objective that the valve not constitute a restriction or impediment to the otherwise free flow of fluid through the hose to and from the system being charged or tested. To this end, the effective cross-sectional area of the passageway that is provided by means of the annular chamber in the valve body and the ports of the nipple in the slide valve embodiment, is preferably no less than that of the internal cross-sectional area of the hose, or nipple, without the valve. Likewise, the effective cross-sectional area of the passageway provided by the annular regions of the threaded screw type valve body is preferably at least as great as the internal cross-sectional area of the hose or nipple without the valve.

BRIEF DESCRIPTION OF THE DRAWINGS

The present invention is further explained in the description which follows with reference to the drawings, illustrating, by way of non-limiting examples, various embodiments of the invention, with like reference numerals representing similar parts throughout the several views, and wherein:

FIG. 1 is a cutaway view of the end of a refrigeration service hose which is known in the prior art;

FIG. 2 is a schematic diagram of the basic refrigeration cycle;

FIG. 9 is a plan view of a nipple component of the environmental slide valve according to the present invention;

FIG. 10 is a cross-sectional view of a nipple component of the environmental slide valve according to the present invention;

FIG. 11 is a cross-sectional view of a sleeve component of the environmental slide valve according to the present invention;

FIG. 12 is a plan view of a seal component of the environmental slide valve according to the present invention;

DETAILED DESCRIPTION OF THE PREFERRED EMBODIMENTS

Figure 3:
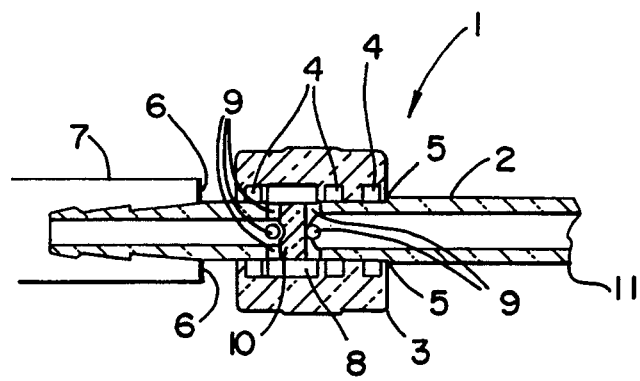
FIG. 3 is a cross-sectional view of an environmental slide valve, in the open position, according to the present invention.

With specific reference to the drawings, FIG. 1 shows a cutaway view of the end of a conventional refrigeration service hose which is known in the prior art. One or more such service hoses may be used in servicing refrigeration/air conditioning systems to check the charge pressure of the refrigerant in the system, to add refrigerant to the system, to check the performance of the compressor (particularly the compressor valves), to test the thermostatic expansion valve, and for various other service procedures.

Hose 107 functions to connect a service valve of the system to be serviced, with a pressure gauge, refrigerant source, pressurized gas source or vacuum source. Hose nut 101 is internally threaded and is adapted to form a liquid-tight and gas-tight connection with the threaded exterior of a refrigeration service valve. One commonly used type of service valve is the Schraeder valve. Thus, within hose nut 101, an adjustable threaded valve depressor 105 is threadably connected to hose nipple 103 and can be adjusted to appropriately depress the core of a Schraeder service valve upon connection of nut 101 to the valve.

Molded gasket 102 seals the valve depressor 105 and nipple 103 to the refrigeration service valve. Safety venting slots 104 are provided within the fitting to ensure that any refrigerant vented from the fitting is vented away from the serviceperson using the apparatus. Nipple 103 is integrally attached to hose 107 at eight-sided crimp 106, which renders the connection gas-tight and liquid-tight.

Hose 107 is typically composed of a seamless nylon inner tube, surrounded by a synthetic braided reinforcement layer which is further surrounded by a thermoplastic cover, which results in a relatively dense, gas-proof and liquid-proof conduit.

Currently, one or more hoses 107, which are typically from three to six feet in length, are connected to service valves via nuts 101 for performing service procedures on a refrigeration or air conditioning system. After connection of hose or hoses 107 to the respective service valves, it is standard procedure to purge the hose or hoses to prevent contamination of the system with air or other contaminants. Purging is usually accomplished by loosening the threads of the connector, at the end of hose 107 opposite that of nut 101, enough to develop a leak at that connection, since the connection at the service valve is leak-proof and open to the flow of pressurized refrigerant. The pressurized refrigerant flows into hose 107 and purges the hose of air and other contaminants.

When the serviceperson senses (by means of a liquid or electronic leak detector, for example) that refrigerant is escaping from the leaky connection, he or she retightens the connection, thereby sealing the connection. Although this procedure results in a hose filled only with refrigerant, a disadvantageous consequence is that small amounts of chlorofluorocarbons are released to the atmosphere each time the purging procedure is performed.

At the end of the service procedure, hose or hoses 107 are removed by unthreading nut or nuts 101 from the service valve or valves. Since the only other valve used with hose 107 is in combination with a pressure gauge or refrigerant source, etc. at the opposite end of hose 107, the entire volume of refrigerant contained in each length of hose, i.e., from three to six feet, e.g., is lost to the environment at the termination of the service procedure, upon disconnecting nut 101, since that end of the hose then becomes open to the atmosphere. This results in a much greater volume of chlorofluorocarbons being released to the atmosphere than occurs during purging. In view of the growing ecological problems in the world and specifically in view of the growing hole in the ozone layer, it is an object of this invention to prevent most, if not all, of the above-described losses of refrigerant to the atmosphere that occur as a result of purging and disconnecting the service hoses.

FIG. 2 is a diagram of the basic refrigeration cycle which shows the basic components, and some optional components, which are present in refrigeration and air conditioning systems. Line A—A' is the dividing line between the low and high pressure sides of the system. The low pressure side is to the right of line A—A' and the high pressure side is to the left of line A—A'. Compressor 64 draws low pressure refrigerant vapor from evaporator 61 through low pressure suction line 62. Compressor 64 compresses the refrigerant vapor and discharges the compressed vapor to condenser 67 via hot compressed vapor discharge line 66.

Condenser 67 consists of a long convoluted tube which has fins extending therefrom, thus giving the condenser a large surface area to allow it to function as a heat exchanger. As the high pressure heated refrigerant passes through condenser 67, fan 74 blows cool air over the condenser's exterior surface. Since a temperature gradient exists from the refrigerant across the condenser wall to the outside air, and since the condenser wall is made of a material which is a good heat conductor, heat energy flows from the refrigerant to the cool air. The surrounding air absorbs the latent heat of condensation which is given off when the refrigerant vapors condense into a liquid. The condensed liquid exits condenser 67 and optionally may be accumulated in a liquid reservoir 69.

The liquid refrigerant then passes through filter-drier 71 which contains a desiccant and filter pads for extracting any water that is present in the refrigerant and for filtering out any solid contaminants, respectively. Optional sight glass 72 allows visual inspection of the refrigerant to determine whether any air has become mixed with the refrigerant. If a significant amount of air has been admitted to the system, the refrigerant will contain bubbles when viewed through sight glass 72. The liquid refrigerant proceeds to thermostatic expansion valve 73 which also divides the system between high and low pressure sides.

Thermostatic expansion valve 73 is located at the inlet side of evaporator 61 and controls the pressure in evaporator 61 by metering the flow of refrigerant to evaporator 61. Thus, evaporator 61 is maintained in a low pressure environment. A capillary tube sensor in thermostatic expansion valve 73 signals a diaphragm to expand or contract so as to vary the flow of refrigerant into evaporator 61 in order to maintain a constant low pressure.

Evaporator 61 is similar in construction to condenser 67 and works on the same heat exchange principle but in reverse mode to what occurs in the condenser. The low pressure condition in evaporator 61 causes the liquid refrigerant to boil and to expand into a gas. The latent heat of vaporization that is required to convert the liquid refrigerant to a gas is absorbed from the air surrounding the fins of evaporator 61. The removal of heat from the surrounding air also dehumidifies the surrounding air as moisture condenses on the exterior surface of the evaporator. The resultant cool dry air is then blown by fan 74 to a location where cooling is desired.

Refrigerant vapors then travel to compressor 64 via low pressure suction line 62 to repeat the cycle. Low pressure service valve 63 and high pressure (discharge) service valve 65 are provided for the connection of service hoses 107 as described above. Low pressure service valve 63 is accessed, among other reasons, for charging the system with refrigerant and for testing the pressure on the low pressure side of the system. High pressure service 65 valve is accessed, among other reasons, for checking the pressure in the high pressure side of the system and thus the performance and condition of the valves in the compressor.

Optionally, a system may also include reservoir service valve 70 for use in evacuating the optional liquid reservoir. As stated before, a common valve used for these purposes is the Schraeder valve, but other known valves and ports can also be used for these purposes.

Figure 4:
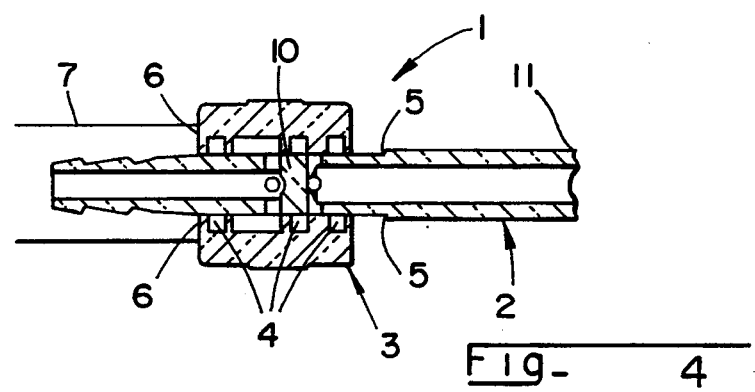
FIG. 4 is a cross-sectional view of an environmental slide valve, in the closed position, according to the present invention.

FIGS. 3 and 4 show cross-sectional views of a means for opening and closing a hose, like hose 107 of FIG. 1, to the flow of liquid and/or gas. While the illustrated device is a slide valve 1, other types of valves and shut off devices may also function for the same purpose. FIG. 3 shows a cross-sectional view of slide valve 1 in the open position, while FIG. 4 shows a cross-sectional view of slide valve 1 in the closed position.

Figure 5:
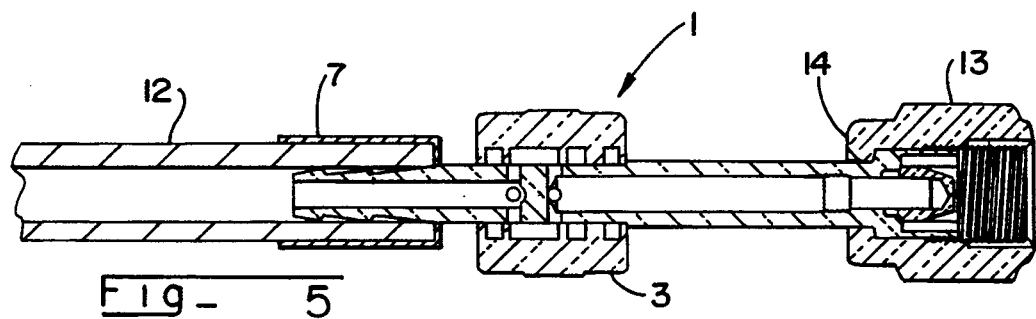
FIG. 5 is a cross-sectional view of a refrigeration service hose having an environmental slide valve integral therewith, in the open position, according to the present invention.
Figure 6:
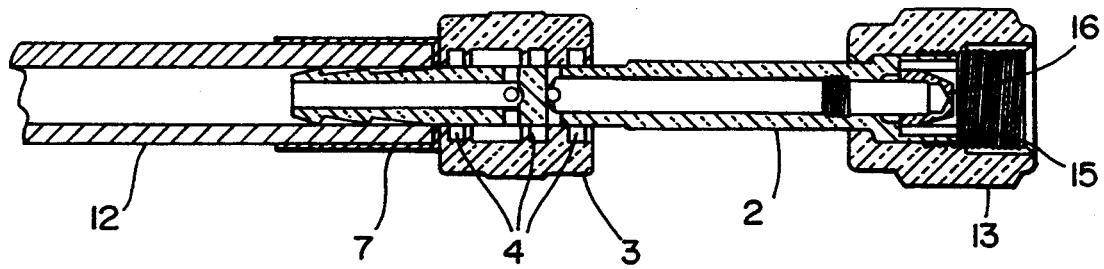
FIG. 6 is a cross-sectional view of a refrigeration service hose having an environmental slide valve integral therewith, in the closed position, according to the present invention.

The slide valve 1 comprises a relatively rigid nipple 2 around which a sleeve 3 is reciprocally positioned for selective communication, via annular chamber 8 in the sleeve 3, between ports 9 on either side of a wall 10, and blockage of such communication. As shown in FIGS. 5 and 6, for example, the nipple 2 provides the main passage between hose 12 and nut 13.

The construction of nipple 2, which can be made of a relatively hard plastic or metal, is more clearly seen in the plan view of FIG. 9 and the cross-sectional view of FIG. 10. Nipple 2 is preferably machined from brass rod and then annealed. However, other equivalent metals, known and used in the art, may be used.

Central bore 19 extends axially through the length of nipple 2 except for the location where wall or blockage 10 divides the central bore into two disconnected passages. Blockage 10 is an integral part of the nipple 2 and extends transversely through the entire cross-section of nipple 2, thereby forming a complete, leak-proof barrier between the divided sections of central bore 19.

Ports 9 extend radially from the ends of central bore 19 which are adjacent blockage 10 and extend to the exterior of nipple 2. Preferably, four ports, spaced ninety degrees apart, radiate from each end, but a greater or fewer number of ports may be provided, if desired. Tip 18 is bevelled and the tip end is chamfered to enhance insertion of the nipple into hose 12 and to restrict the nipple from a tendency to slide out of hose 12 after it has been inserted. Central bore 19 is produced to have a diameter which matches the inside diameter of hose 12 as nearly as possible, to minimize restriction of flow. Threads 22 are cut to accept an adjustable threaded valve core depressor 16, as shown in FIGS. 5 and 6, for example. End 21 is configured to accept the mounting of nut 13 and gasket 14 thereover.

Sleeve 3 surrounds nipple 2 and is axially slidable therealong to effect opening and closing of the valve. The axial distance between the full open position to the full closed position is preferably about ¼ thereby making the open/close cycle a relatively easy one hand procedure for the technician. Sleeve 3 is preferably machined from brass rod and then annealed, but just as in the case of the nipple, sleeve 3 may be formed of other metals which are known to the art to function roughly equivalently for such purposes. The exterior surface 24 of sleeve 3 is preferably knurled to enhance the ease of manipulation (i.e., sliding) by increasing the friction upon contact by the operator.

Details of sleeve 3 may be more clearly observed in the cross-sectional view of FIG. 11. Annuli 23 are formed within the inner wall of sleeve 3 to accept seals for providing a liquid-tight and gas-tight seal between sleeve 3 and nipple 2. Annular chamber 8 is also provided within sleeve 8, and has a length approximately equal to the distance between the two sets of ports 9.

As shown in FIG. 3, in the open position, annular chamber 8 connects ports 9 and provides a conduit around blockage 10 so that central bores 19 are connected and the flow of liquid and gases can proceed through the valve. FIG. 4 illustrates the closed position, subsequent to the sleeve 3 having been slid leftwardly in the figure toward ferrule 7, wherein annular chamber 8 no longer bridges both sets of ports 9. Further, seals 4 prevent the escape of any liquid or gas and, therefore, flow through the valve is prohibited.

FIG. 12 show a side view of a sealing member 4. Seal 4 is preferably formed from neoprene but may be formed from other polymers, natural or synthetic, which are known to the art to provide a useful seal for this purpose. The inside diameter of each seal 4 is slightly smaller than the outside diameter of nipple 2 at the location where sleeve 3 surrounds nipple 2 and the outside diameter of each seal 4 is slightly greater than the diameters of annuli 23. As shown in FIGS. 3 and 4, seals 4 are press-fitted into annuli 23 of sleeve 3 and sleeve 3 is mounted over and around nipple 2.

Nipple 2 is also shaped to provide a surface comprising a positive stop 5 against which sleeve 3 abuts when in the open position. Although FIGS. 3 and 4 show a valve which is configured such that positive stop 5 stop sleeve 3 in the open position, it is to be understood that the valve could be configured such that positive stop 5 could stop sleeve 3 in the closed position.

Ferrule 7 is provided to surround hose 12 and provide the hose with external support for tightly holding nipple 2 upon insertion. Ferrule 7 also provides a surface which functions as a second positive stop 6 for stopping sleeve 3 in the closed position. Although the illustrated embodiment shows the nipple 2 and ferrule 7 as providing means for stopping the sleeve in the open and closed position of the valve, respectively, it is contemplated that the nipple and sleeve could be designed in such a way that the stop 6 stops the sleeve in the open position and that the stop 5 stops the sleeve in the closed position. In such a case, the annular chamber 8, internal to the sleeve 3, would be appropriately repositioned to provide an open passageway between the annular chamber 8 and the ports 9 when the sleeve is stopped adjacent stop 6 and to close such passageway when the sleeve is stopped adjacent stop 5.

In all embodiments of the invention, the effective cross-sectional area of the passageway that is provided by means of the annular chamber 8 and the ports 9 (or annular spaces 57a and 57b, in the screw type valve further described below) is no less than that of the internal cross-sectional area of the hose, or nipple(s), without the valve 1 (or 1'). This prevents the slide, screw thread, or other type of valve from constituting a restriction or impediment to the otherwise free flow of fluid through the hose to and from the system being charged or tested.

FIGS. 5 and 6 show cross-sectional views of a refrigeration service hose having an environmental slide valve integral therewith, in the open and closed positions, respectively, according to the present invention. Ferrule 7 surrounds the end of hose 12 into which nipple 2 is inserted. Nut 13 and gasket 14 are molded over the opposite end of nipple 2, and adjustable threaded valve depressor is threaded therein.

The environmental slide valve is preferably provided as an integral package with refrigeration hose 12 as shown in FIGS. 4 and 5, but is also provided by itself for conversion of existing refrigeration hoses which lack a means for preventing the escape of refrigerants during servicing of air conditioning and refrigeration systems. Thus, the conduit segment, or nipple, 2 and the hose 12 can be considered, together, to comprise a conduit arrangement for conducting refrigerant to a fluid, i.e., to a refrigerant-receiving device, i.e., an air conditioning or refrigeration system.

Figure 7:
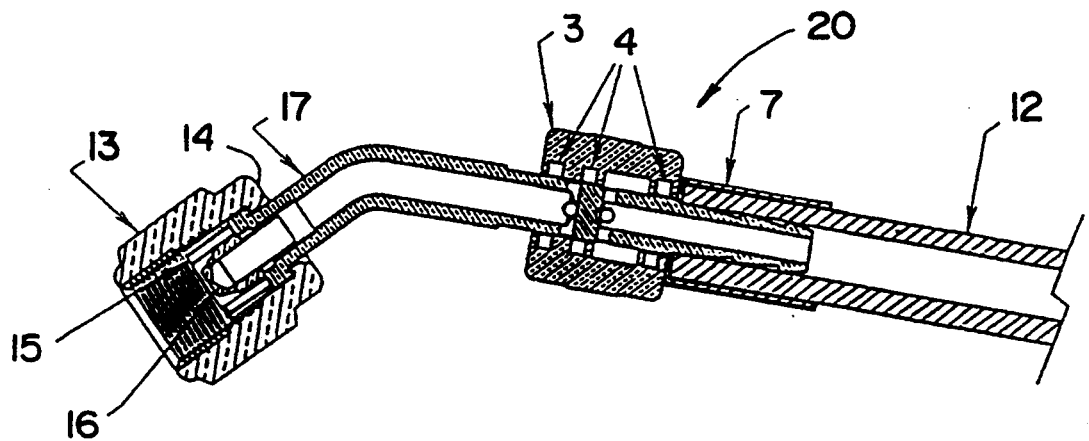
FIG. 7 is a cross-sectional view of a second embodiment of a refrigeration service hose having an environmental slide valve integral therewith, in the closed position, according to the present invention.
Figure 8:
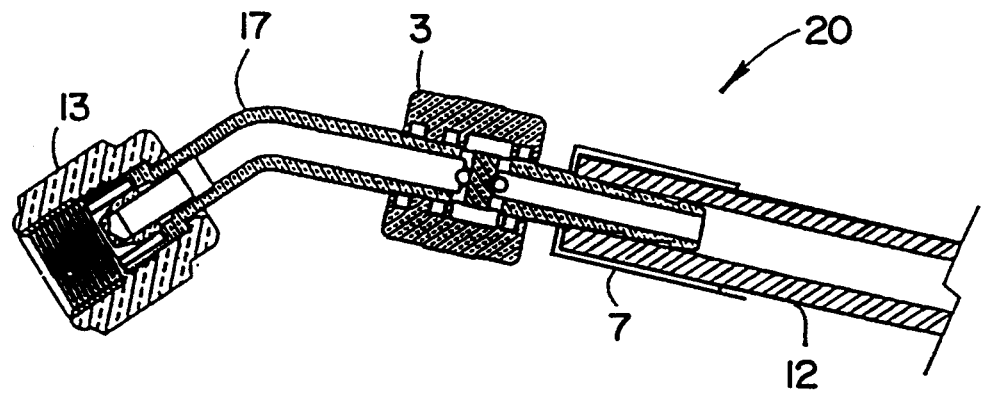
FIG. 8 is a cross-sectional view of a second embodiment of a refrigeration service hose having an environmental slide valve integral therewith, in the open position, according to the present invention.

FIGS. 7 and 8 show cross-sectional views of another embodiment of a refrigeration service hose having an environmental slide valve integral therewith, in the closed and open positions, respectively, according to the present invention. This embodiment is identical to the previously described embodiment with the exception of a bend 17 which is provided in the nipple near its connection to nut 13. Bend 17 makes connection of nut 13 to a service valve easier in certain circumstances, where access to the service valve is limited.

Figure 13:
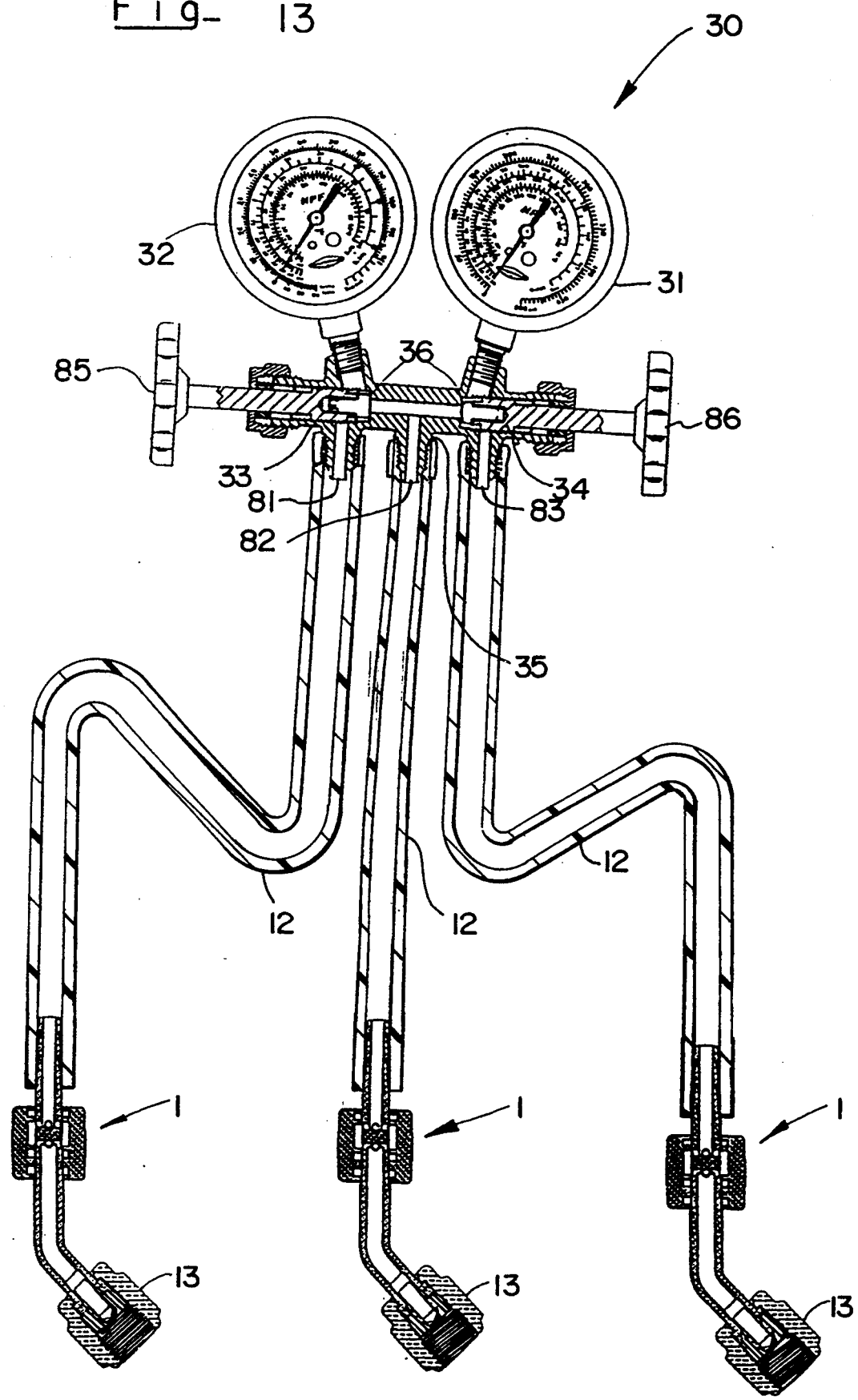
FIG. 13 is a view, in partial cross-section, of a refrigeration service apparatus, constituted by a three port manifold, according to a particular embodiment of the present invention.

FIG. 13 shows a refrigeration service apparatus, in partial cross-section, which include refrigeration hoses 12 and environmental slide valves 1 according to the present invention. Manifold 30 includes low pressure port 81, high pressure port 83, and common port 82 which is capable of communicating with the other two ports 81 and 83 when valves 33 and 34 are in the open positions.

Low pressure or compound gauge 32 is threaded to manifold 30 and communicates with port 81 when handle 85 is turned to open low pressure valve 33, thereby unseating Teflon seal 36. The low pressure side is used to measure the refrigerant pressure on the low pressure side of a refrigeration/air conditioning system. Nut 13 leading from hose 12 on the low pressure side is threaded to the low pressure service valve. Because at this time, refrigerant will already be present within hose 12, no purging or bleeding of the system is necessary. After connecting nut 13 to the service valve, slide valve 1 is slid to the open position and valve 33 is opened to measure the pressure in the low side of the system. At the end of the procedure, the operator closes valve 33 and slides valve 1 to the closed position, thereby retaining refrigerant in hose 12. Nut 13 can then be removed from the service valve without releasing a significant amount of chlorofluorocarbons to the atmosphere.

Hose 12, which is connected to common port 82, leads to a refrigerant source or vacuum source to which it is connected for charging or evacuating a system. For example, when nut 13 from the common port hose is connected to a refrigerant source, and nut 13 from the low pressure hose is connected to a low pressure service valve as described above, the operator can charge the system without having to first purge the two hoses. Likewise, after charging is complete, by closing the two slide valves 1, the operator prevents a volume of chlorofluorocarbons equal to the capacities of the two hoses from escaping into the atmosphere in a direction downstream from the manifold 30 toward the nut 13 at the end of the hose 12. With the use of the environmental slide valve 3, the only amount of refrigerant that could possibly be lost is the volume between the slide valve 3 and the refrigeration nipple, which would have been connected to the nut 13, which would be represented by a distance of approximately 1.7 inches.

High pressure port 83 communicates with high pressure valve 34, when high pressure valve 34 is opened by turning handle 86. Similarly to the low pressure hose, the high pressure hose is connected to a high pressure service valve and is used, for example, to measure the pressure output of the compressor to determine the adequacy of the compressor's valves. Slide valve 1 operates similarly to the slide valves on the other two hoses and prevents the escape of refrigerants to the atmosphere, while also saving the serviceperson time by eliminating the need to purge the hoses prior to conducting a service procedure.

Figure 14:
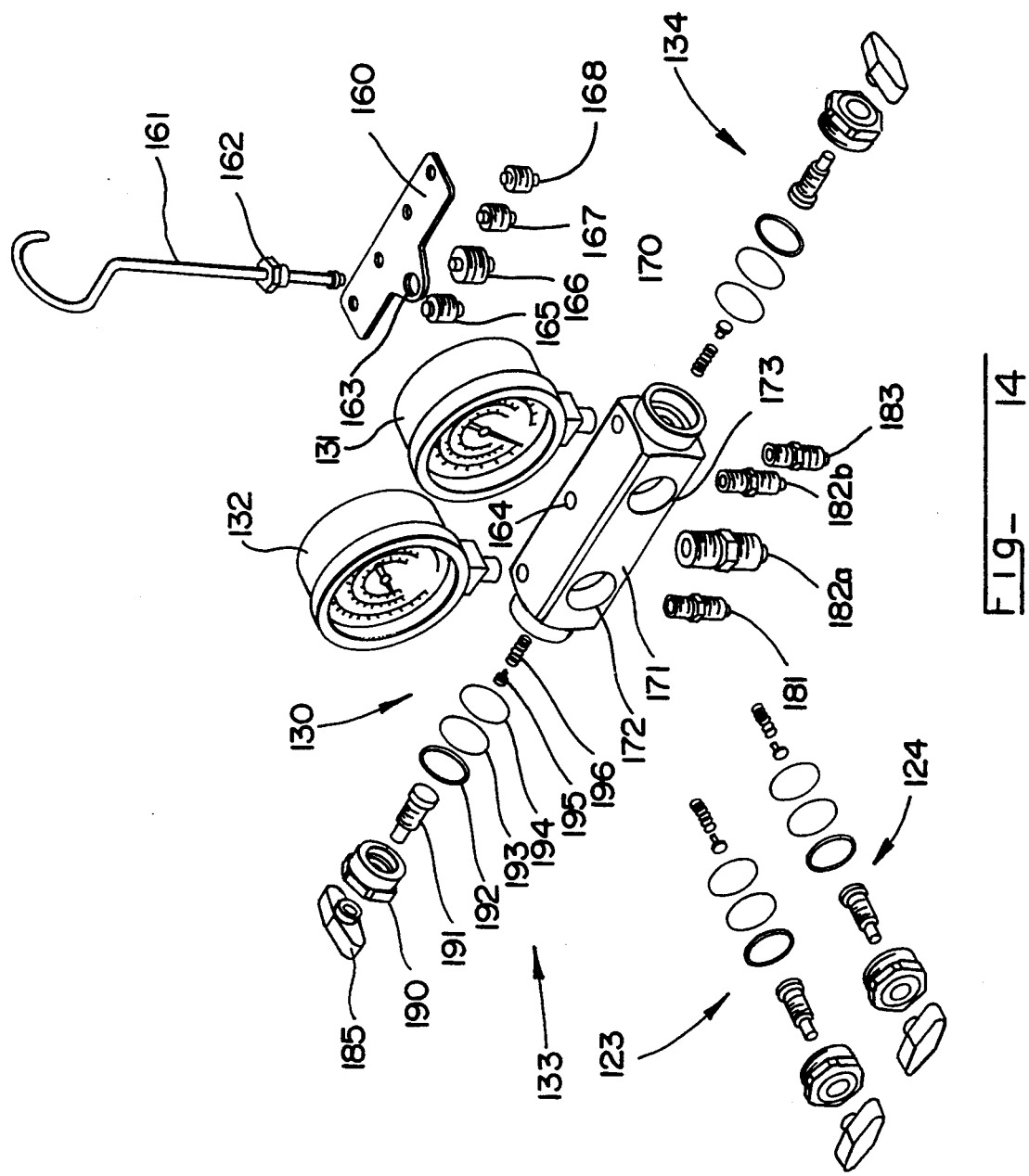
FIG. 14 is an exploded perspective view of a four port manifold, according to a further embodiment of the present invention.

Although the embodiment depicted in FIG. 13 is directed to a so-called "three port" manifold, the invention is also contemplated to be used with a "four port" manifold, as shown in FIG. 14, where it is identified by reference numeral 130. In a four port manifold, two intermediate hoses, not shown in FIG. 14, but constructed essentially like hoses 12 of the previously described embodiments, are employed instead of one. Whereas in the three port manifold of FIG. 13, the one intermediate common port 82 is positioned between low pressure port 81 and high pressure port 83, a pair of intermediate ports are provided in the four port manifold by means of connection nipples 182a, 182b, which are inserted into the lower face of the manifold body 170. These connection nipples are positioned between the low and high pressure ports, provided by connection nipples, 181, 183, respectively, inserted into the lower face of the manifold body.

A hose is then connected to each of nipples 181, 182a, 182b, and 183 and, proximate the end of each such hose, a slide valve according to the invention, like that described above with regard to other embodiments of the invention, is connected.

In the embodiment illustrated in FIG. 14, the connection nipple 182a is provided for connection to a vacuum source. The connection nipple 182b is provided for connection to a source of refrigerant, for charging a refrigeration system. As shown, the connection nipple 182a has a diameter somewhat larger than those of nipples 181, 182b, and 183. For example, in a preferred embodiment, nipples 181, 182b, and 183 have a diameter of ¼ SAE and nipple 182a has a diameter of ⅜ SAE. Likewise, the hose, not shown, which is attached to nipple 182a, has a larger internal cross-sectional area than those of the hoses which are attached to nipples 181, 182b, and 183. It has been found that the larger size (⅜ SAE) port is more effective for use with drawing a vacuum therethrough, i.e., a vacuum can be established more quickly.

The four port manifold 130 also includes a valve 133, like valve 33 described above, and a valve 134, like valve 34, described above. In the exploded diagram of FIG. 14, the parts of such a valve are shown, such parts being labelled for valve 133, but which are identical for valve 134 and valves 123, 124, further described below, and could be the same as for the aforementioned valves 33 and 34, if desired.

The representative components of valve 133 will now be briefly described. Handle 185, valve nut 190, and valve stem 191 constitute a handle assembly. Backup valve gasket 193, valve gasket 194, and spring insert 195 comprise a valve seal repair kit, wherein a slip ring 192 is to be inserted between the valve handle assembly and the gasket 193. Lastly, a valve spring 196 provides the necessary bias against the valve stem and spring insert.

Attached to the upper surface of the manifold body 170 is bracket assembly, comprising a bracket 160, which is attached to the manifold body 170 by means of a hook 161, the hook 161 extending through opening 163 in the bracket 160. An end of the hook 161 has external threads on an end for attachment to the manifold body 170 at the internally threaded opening 164. Hook nut 162 effectively secures the bracket 160 to the valve body. The upper portion of the hook 161 enables the manifold 130 to be conveniently suspended or otherwise supported, as needed.

Attached to the bracket 160 are blind hose connections 165, 166, 167, 168, having external threads and respective diameters corresponding to those of nipples 181, 182a, 182b, and 183. For example, as shown in FIG. 14, hose connections 165, 167, and 168 have ¼ SAE diameters, whereas hose connection 166 has a ⅜ SAE diameter. The blind hose connections 165, 166, 167, 168 provide a convenient location for the ends of the hoses, not shown, which would otherwise be left to dangle from the valve ports constituted by the nipples 181, 182a, 182b, and 183. Thus, when the manifold in not in use, the four hoses would be connected, via their respective hose nuts, to the blind hose connections 165, 166, 167, 168 which also ensure a dust-free environment for the interior of the hoses.

As mentioned above, the four port manifold 130 includes a pair of valve assemblies 123 and 124. Valve assembly 123 is dedicated for use with the vacuum line and is installed in the front face 171 of the manifold body 170 at bore 172 adjacent the vacuum port provided by nipple 182a. Valve assembly 124 is dedicated for use with the refrigerant charging line and is installed in the front face 171 of the manifold body 170 at bore 173 adjacent the refrigerant charging port provided by nipple 182b.

By means of the aforementioned assembly constituting the four port manifold 130, the following procedure can be performed at the time of charging a refrigeration system with refrigerant, for example. The vacuum port, comprising nipple 182a, is connected to a vacuum source via its hose, and the refrigerant port, comprising nipple 182b, is connected to a source of refrigerant via its respective hose, although the connection is initially maintained closed. The low pressure port and the high pressure port are connected to the low pressure and high pressure sides, respectively, of the refrigeration system to be serviced, in a manner previously described in connection with FIG. 13.

Before charging the low pressure side with refrigerant, for example, the vacuum valve assembly 123 and the respective slide valve in the vacuum hose, not shown, are opened, to draw a vacuum in the refrigerant line to thereby ensure that same is purged and cleaned. After such purging, the vacuum valve assembly 123 is closed, as well as the slide valve located in the vacuum hose, proximate its end, not shown, but which is constructed essentially like the slide valves illustrated and described in connection with FIG. 13. Thereafter, the low pressure valve assembly 133 and the refrigerant valve assembly 124 are opened, as well as the slide valves, not shown, in the low pressure and refrigerant hoses, to thereby establish fluid communication for the refrigerant from the refrigerant source to the low pressure side of the refrigeration system.

After charging is completed, the valve assemblies 133, 124, and the slide valves in the low pressure and refrigerant hoses are closed, whereby refrigerant is maintained therein, as in the previously described embodiment of FIG. 13, to prevent escape of refrigerant to the atmosphere.

For testing the high pressure side of the refrigeration system with the four port manifold of FIG. 14, one utilizes the method described with regard to the FIG. 13 embodiment, whereby communication is established between the high pressure hose and the valve manifold and high pressure gauge 131, via the port constituted by connection nipple 183. After completing such testing, refrigerant is maintained in the high pressure hose by virtue of the slide valve being closed at the distal end of the high pressure hose, prior to connecting such distal end to the connection nipple 168 in the non-use position, to prevent escape of refrigerant into the atmosphere.

In the embodiment of FIG. 14, as well as in the other embodiments of the invention, the slide valves at the ends of the hoses can be closed, in the non-use positions of the apparatus, to maintain any fluid within each hose, between its respective slide valve, at the distal end of the hose, and the respective port at the manifold body.

Figure 15:
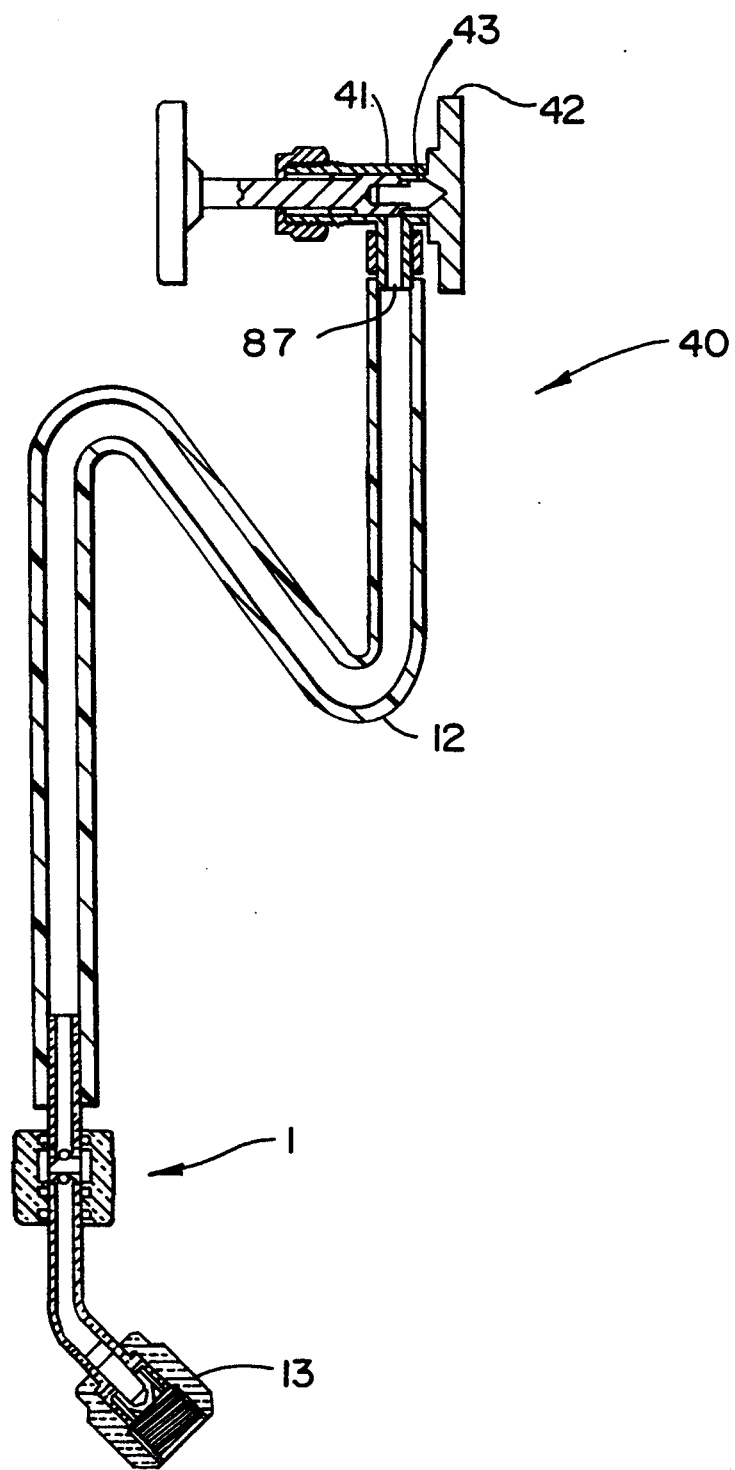
FIG. 15 is a view, in partial cross-section, of a still further embodiment of a refrigeration service apparatus according to the present invention.

FIG. 15 shows a simpler embodiment of a refrigeration service apparatus that employs only one refrigeration hose. Nut 42 of apparatus 40 is adapted to be threaded to a refrigerant source. Piercing member 43 accesses the refrigerant in the refrigerant source after nut 42 has been secured and valve 41 is opened. Prior to accessing the refrigerant, nut 13 will have been connected to a low pressure service valve as described previously. Slide valve 1 is opened to allow the refrigerant to flow into and "charge" the system. After charging, valve 41 is closed and slide valve 1 is closed to prevent a flow of refrigerant from an upstream position to a downstream position in a direction toward nut 13. Thereafter, nut 13 can be removed and the amount of refrigerant escaping to the environment is minimized.

Figure 16:
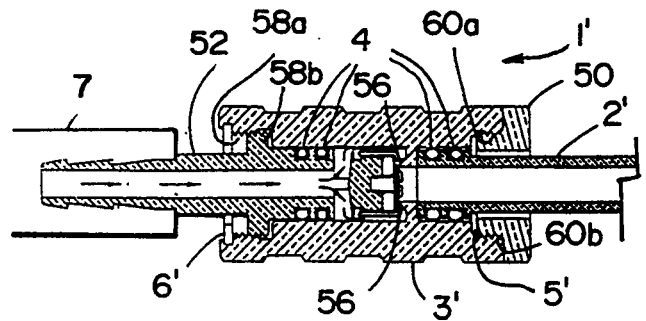
FIG. 16 is a cross-sectional view of an environmental threaded screw type valve, in the closed position, according to the present invention.
Figure 17:
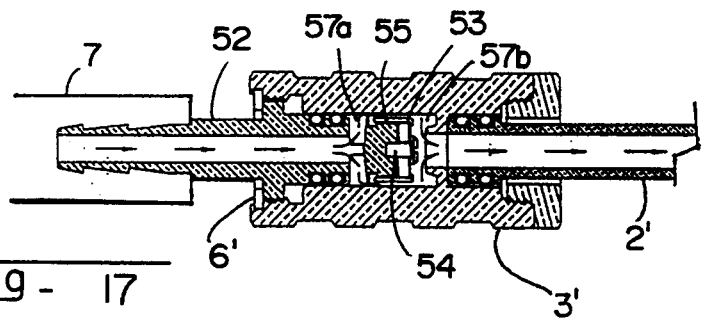
FIG. 17 is a cross-sectional view of an environmental threaded screw type valve, in the open position, according to the present invention.

FIGS. 16 and 17 show cross-sectional views of a preferred means for opening and closing a hose, like hose 107 of FIG. 1, to the flow of liquid and/or gas. While the illustrated preferred device is a threaded screw type valve 1', other types of valves and shut off devices (such as the one shown in FIG. 3, for example) may also function for the same purpose. FIG. 16 shows a cross-sectional view of threaded screw type valve 1' in the closed position, while FIG. 17 shows a cross-sectional view of threaded screw type valve 1' in the open position.

The threaded screw type valve 1' will now be described with regard to components which differ from those described above with respect to the slide valve embodiment. Both disclosed embodiments provide a similar general function, as will become apparent from the following description. Nevertheless, the screw type valve provides additional advantages, as will also be evident from the following description. In practice, therefore, the screw type valve is preferred, due at least to the threaded rotatable body, providing a more precise opening and closing of the valve and due to the capability of interchangeability of the service connector, as further described below.

With regard to the embodiment of the invention in which the aforementioned screw type valve is employed, like components have been assigned like reference numerals and a description of such components is provided above with regard to FIGS. 3 and 4. Valve body 3' is internally threadably engaged, by means of threads 58a, with an externally threaded portion 58b of rear nipple 52 at one end and, by means of threads 60a, with the external threads 60b of retaining nut 50 at a second end. Annular spaces 57a and 57b are positioned at opposite sides of seat 53, carried by the nipple 52, for communication in the open position of threaded screw type valve 1' shown in FIG. 17.

When threaded to its rearmost position, by means of rotation thereof, threaded body 3' draws rear nipple 52 forward so as to bring seat 53 into sealing contact with valve fitting 56 as shown in FIG. 16. The contact between seat 53 and fitting 56 prevents fluid flow, thereby closing valve 1'. Seals 4 prevent the escape of gas or liquid between threaded valve body 3' and front and rear nipples 2' and 52, respectively. Seat 53 is replaceably mounted to threaded seat nut 55 via seat screw 54.

C-ring 5' is provided on the service connector, or front nipple 2', for providing a stop against which retaining nut 50 and threaded valve body 3' are torqued. This configuration further allows front nipple 2' to rotate freely about its axis with respect to retaining nut 50 and threaded valve body 3', so as to prevent twisting or tangling of hose 12 during use. At the same time, seals 4 prevent the escape of gas or fluid even during rotation. Retaining ring 6' is provided along rear nipple 52 for preventing the threaded portion of rear nipple 20 52 from extending past the rear threaded portion of threaded valve body 3'.

The swivel coupling just described is similar in principle to that disclosed in U.S. Pat. No. 3,537,652, issued Nov. 3, 1970, which discloses a connector for a gas-air torch, including a gas inlet swivel that allows a gas-air blowpipe to be freely movable without any twisting and turning to keep the gas supply hose connected thereto in uncoiled condition. For this purpose, the subject matter described in U.S. Pat. No. 3,537,652 is hereby expressly incorporated by reference thereto in its entirety.

Figure 18:
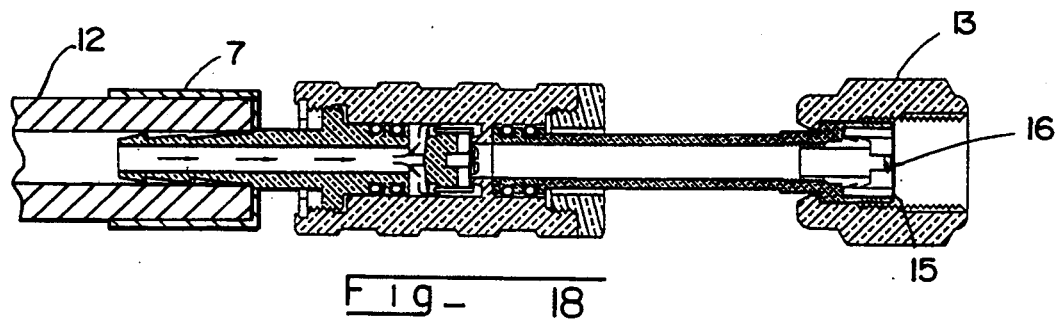
FIG. 18 is a cross-sectional view of a refrigeration service hose having an environmental threaded screw type valve integral therewith, in the closed position, according to the present invention.
Figure 20:
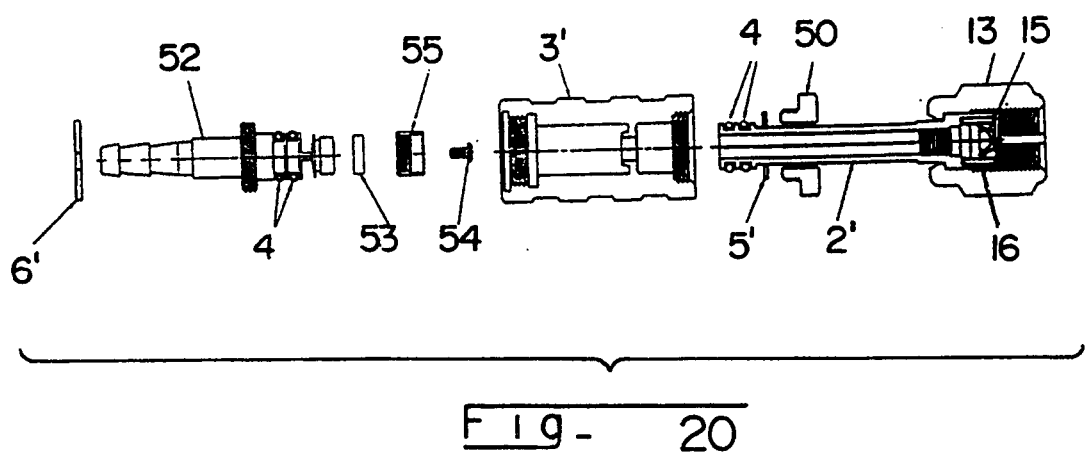
FIG. 20 is an exploded cross-sectional view of the threaded screw type valve shown in FIGS. 16–17.

An added advantage gained by using the environmental threaded screw type valve embodiment, is the ability to easily interchange the type of front nipple for use in servicing. That is, the apparatus is field serviceable and field interchangeable. More specifically, upon closing of the valve as shown in FIG. 18, retainer nut 50 can be removed, as shown in FIG. 20, thereby allowing the removal and replacement of the service connector, or front nipple 2' with one having a different configuration, depending upon the particular requirements of the apparatus being serviced. For example, a nipple 2' having a 45 degree bend configuration, such as that shown in FIGS. 7 and 8 may be connected, or a nipple having a 90 degree bend, or any other configuration for adaptation to an existing apparatus or service environment, or for adaption of a yet-to-be-developed apparatus or service environment, which makes connection of the service hose more convenient may be attached. That is, all such service connectors would merely need to include a standard configuration for connection to the valve of the invention.

Advantageously, valve 1' allows such interchanges without loss of fluid and without having to make any other disconnections, bleedings or reconnections other than those already described, since the valve 1' is closed during the interchange. Thus a tremendous amount of versatility is added to the device by allowing any suitable service connector to be connected via an easily interchangeable front nipple.

Once the reconnection has been made, a simple rotation of threaded valve body 3' allows a high flow rate of gas and/or liquid to be transferred through valve 1'.

As shown in FIG. 17, when threaded valve body is rotated in the opposite direction to the direction required to close the valve, seat 53 is drawn away from valve fitting 56, thereby opening annular space 57b to allow gas and/or liquid to convey from annular space 57a, thereby opening the valve.

Figure 19:
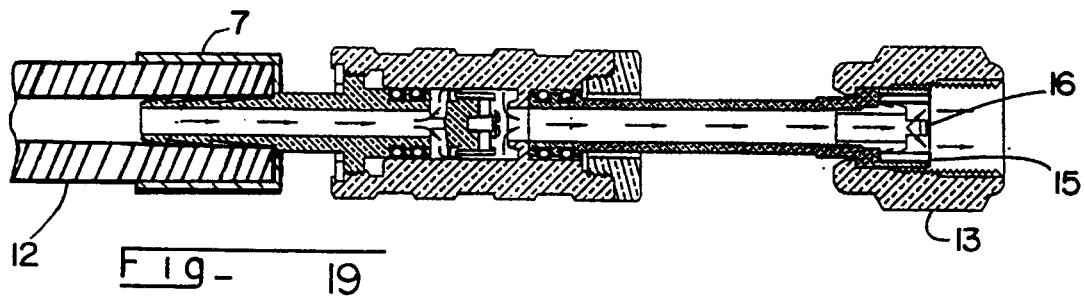
FIG. 19 is a cross-sectional view of a refrigeration service hose having an environmental threaded screw type valve integral therewith, in the open position, according to the present invention.

FIGS. 18 and 19 are similar to FIGS. 6 and 5, respectively, except that the threaded screw type valve replaces the slide valve. Similarly, the threaded screw type valve can be used interchangeably with slide valve in the apparatuses shown in FIGS. 7, 8, 13, 14 and 15. Threaded screw type valve is also provided by itself for conversion of existing refrigeration hoses which lack a means for preventing the escape of refrigerants during servicing of air conditioning and refrigeration systems.

The construction of nipples 2' and 52, similar to nipple 2, which can be made of a relatively hard plastic or metal, are more clearly seen in the exploded cross-sectional view of FIG. 20, and are preferably made from brass. However, other materials, known and used in the art, may be used.

Central bore 19 extends axially through the length of both nipples 2' and 52. However, seat 53 acts to block flow between the central bores of the respective nipples when threaded valve body 3' is in its closed position as described above.

Threaded valve body 3' surrounds nipples 2' and 52 and is threadably engaged with a portion of rear nipple 52 as described above and as shown in FIGS. 16-19. Retaining nut 50, in conjunction with c-ring 5' holds front nipple in place with regard to threaded valve body 3. Threaded valve body 3' is capable of being rotated with one hand of an operator to effectuate opening and closing of environmental threaded screw type valve 1'. A further advantage of the threaded screw type valve embodiment is that it may be easily field serviced.

Figure 21:
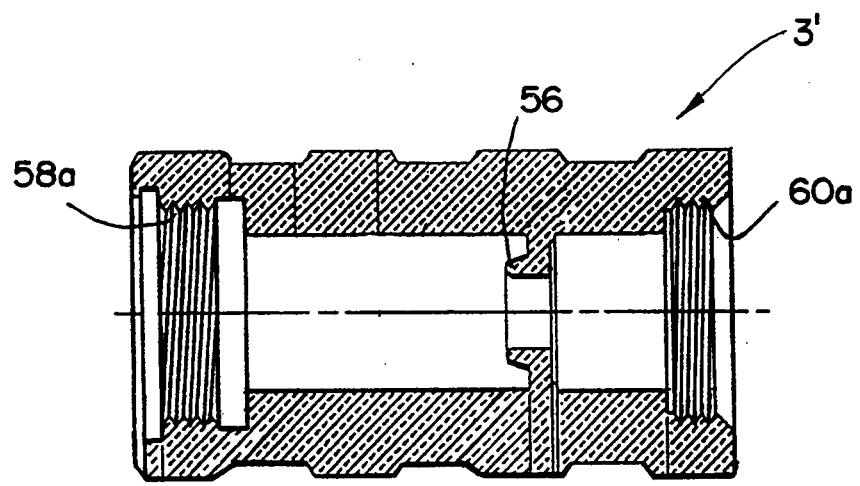
FIG. 21 is a cross-sectional view of the threaded valve body portion of the threaded screw type valve according to the present invention.

Details of threaded valve body 3' and especially valve fitting 56, are more clearly shown in the cross-sectional view of FIG. 21.

In all embodiments of the invention, the effective cross-sectional area of the passageway that is provided by means of the annular chamber 8 and the ports 9 is preferably no less than that of the internal cross-sectional area of the hose, or nipple, without the valve 1. This prevents the slide, screw thread, or other type of valve, from constituting a restriction or impediment to the otherwise free flow of fluid through the hose to and from the system being charged or tested.

Threaded screw type valve 1' gives a positive on/off control of the flow through hose 12 and can be easily operated under pressure or vacuum without leaks. The valve is compact and does not require a great deal of rotation for moving between on and off conditions, and can in fact, be operated by one hand. As mentioned above, the valve also advantageously allows for the easy exchange of service connectors during use.

The invention is also economically advantageous since it conserves refrigerant. The elimination of the need to purge hoses also greatly reduces incidences of "freeze burns" which commonly occur when refrigeration technicians are exposed to the release of refrigerant gases.

Although the invention has been described with reference to particular means, materials and embodiments, it is to be understood that the invention is not limited to the particulars disclosed and extends to all equivalents within the scope of the claims.

What is claimed is:

1. A method of servicing air conditioner or refrigeration systems comprising:
   manipulating a conduit having a first end and a second end with means for blocking and unblocking flow located adjacent said second end of said conduit, said conduit interconnecting a fluid source and a service connector, wherein said second end is connected to the service connector and said first end is connected to the fluid source; said manipulating comprising the steps of:
   blocking flow through said conduit with said means for blocking and unblocking flow when a predetermined amount of fluid has passed through said conduit; and
   disconnecting said second end from the service connector without substantial loss of fluid from said conduit;
   wherein said flow blocking step is completed prior to beginning said disconnecting step.

2. The method of claim 1, further comprising the steps of:
   connecting said second end to another service connector;
   unblocking flow through said conduit with said means for blocking and unblocking flow, substantially at said second end of said conduit, to allow a quantity of fluid to pass through said conduit for servicing another air conditioning or refrigeration device via said another service connector.

3. The method of claim 2, wherein the steps recited in claim 2 are repeated to service a predetermined number of air conditioning or refrigeration devices, without substantial loss of fluid to the environment.

4. The method of claim 4, further comprising:
   interconnecting the fluid source and the service connector, prior to said manipulating step, said interconnecting comprising, in the flowing order the steps of:
   blocking flow through said conduit with said means for blocking and unblocking flow;
   connecting said first end to the fluid source with a leakproof connection;
   connecting said second end to the service connector with a leakproof connection; and
   unblocking flow through said conduit with said means for blocking and unblocking flow, after said leakproof connection at said second end has been completed.

5. The method of claim 4, wherein the fluid source includes second means for blocking and unblocking flow, said interconnecting further comprising:
   unblocking flow with said second means for blocking and unblocking flow, either immediately before or immediately after unblocking flow with said means for blocking flow.

6. The method of claim 1, wherein said means for blocking and unblocking flow comprises a threaded screw type valve and said flow blocking step is accomplished by closing said screw type valve.

7. The method of claim 1, wherein said means for blocking and unblocking flow comprises a slide type valve, and said flow blocking step is accomplished by sliding said slide type valve to a closed position.

* * * * *